United States Patent [19]
Chou

[11] Patent Number: 5,845,821
[45] Date of Patent: Dec. 8, 1998

[54] SIMPLIFIED UNIDIRECTIONAL VALVE STRUCTURE

[75] Inventor: Chiu-Sung Chou, Chia-Yi, Taiwan

[73] Assignee: Chin Ray Industrial Co., Ltd., Chia-Yi Hsien, Taiwan

[21] Appl. No.: 763,059

[22] Filed: Dec. 10, 1996

[51] Int. Cl.$^6$ ...................................................... B65D 5/72
[52] U.S. Cl. ............................................................ 222/494
[58] Field of Search ................................... 222/3, 494

[56] References Cited

U.S. PATENT DOCUMENTS 1,922,204  8/1933  Johnson .................................. 222/494
2,014,881  9/1935  Carlstrom ............................... 222/494
5,405,063  4/1995  Chen ....................................... 222/494

Primary Examiner—Gregory L. Huson
Attorney, Agent, or Firm—Bacon & Thomas, PLLC

[57] ABSTRACT

A valve nozzle structure include a valve stem. On the valve stem is a collar flange and along both sides of collar flange is a series of tapered retainer lips. A passage is formed through the valve stem, a flexible valve sleeve is inserted on the tapered retainer lips on one side of the valve stem, and a slit is incised in the valve sleeve, with the slit normally in a sealed state of closure. The foregoing structure permits gas to flowing towards the valve sleeve to travel only in a single direction through the passage.

1 Claim, 3 Drawing Sheets

SIMPLIFIED UNIDIRECTIONAL VALVE STRUCTURE

BACKGROUND OF THE INVENTION

1. Field of the Invention

The invention herein relates to a valve nozzle of uncomplicated structure that is capable of controlling the flow of gas traveling internally in a single direction.

2. Description of the Related Art

Frequently utilized to control the direction of gaseous flow or to control the volume of a gaseous flow, valve nozzle structures are commonly employed in liquid pressure or gaseous pressure circuits. The invention herein is mainly concerned with an improvement of the valve components in such valve nozzle structures particular for use in devices such as pneumatic tire pressure gauges, sports ball pressure gauges, engine pressure gauges and other pressure metering applications. The structure of these types of valve nozzles currently in general use, as indicated in FIG. 1, is mainly comprised of a metal valve seat (1) having an air passage (11) and a containment chamber (12) at the rear end of the air passage (11), and positioned inside the containment chamber (12) is a cone-shaped spring (13), with the shaft pin (15) of the flange (14) inserted through the air passage (11) of the valve seat (1) at one end and a flexible collar (16) inserted on the opposite end. Since the aforesaid flange (14) is against the end section of the cone-shaped spring (13) and, furthermore, is subjected to the rearward tensile force of the cone-shaped spring (13), the aforesaid flexible collar (16) constantly maintains the seal formed at the end of the valve seat (1). When gas flows from the containment chamber (12), passes into the air passage (11) and travels through the flexible collar (16), as indicated in FIG. 2, the gas presses down on the flange (14) and compresses the cone-shaped spring (13), causing the flexible collar (16) to move along the shaft pin (15) and thereby separate from the end surface of the valve seat (1) to form an gap (1). As a result, gas can flow through the interval along the cone-shaped spring (13) as well as pass by the interstices along the shaft pin (15), and then flow out through the space (17) at the end surfaces between the flexible collar (16) and the valve seat (16). However, when the gas flows from the flexible collar (16) towards the containment chamber (12), since the gas presses down on the sealed closure formed between the flexible collar (16) and the valve seat (1), the aforesaid space (17) is not present and the gas cannot flow. The valve nozzle of the invention herein similarly provides a means of unidirectional gas flow but with a simplified structure.

Although the conventional valve nozzle is uncomplicated in structure, and can be utilized in a range of metering pressure gauge applications, and since the structure is comprised of four individual components, i.e., a valve seat, a cone-shaped spring, a shaft pin and a flexible collar, and in addition only provides for a relatively small air pressure flow, the overall capacity being only approximately a diminutive 10 cubic centimeters, in situations where numerous components are fabricated, the process of manufacture can still obviously be very complex. Certain components are likely to fall off during production and assembly such that total functioning is not possible. Furthermore, the more components involved the more molds required during production and at the same time, the more malfunctions after manufacturing during utilization. Therefore, the prior art cannot be considered ideal in terms of practicality.

SUMMARY OF THE INVENTION

The objective of the invention herein is to provide an improved valve nozzle that includes a valve stem, on the aforesaid valve stem collar flange, and along both sides of collar flange series of tapered retainer lips. A passage is formed through the valve stem and a flexible valve sleeve is inserted on the aforesaid tapered retainer lips on one side of the aforesaid valve stem. A slit is incised in the aforesaid valve sleeve and, furthermore, the aforesaid slit is normally in a sealed state of closure.

BRIEF DESCRIPTION OF THE DRAWINGS

Other features and advantages of the invention herein will become apparent in the following detailed description of the preferred embodiments with reference to the accompanying drawings, in which.

DESCRIPTION OF THE INVENTION

In the detailed description of the preferred embodiments herein, similar elements are indicated with the same reference numbers throughout the disclosure.

Figure 1:
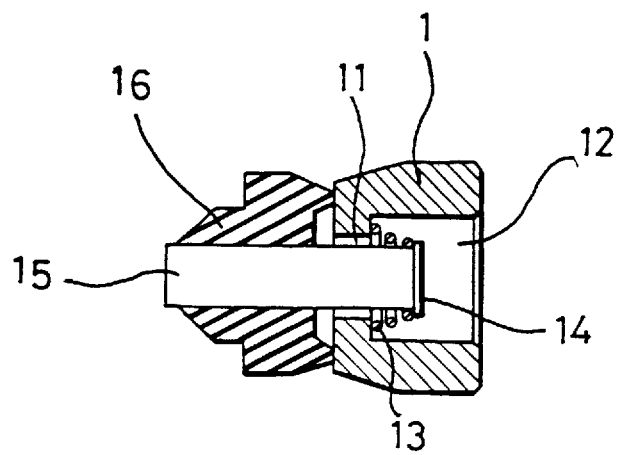
FIG. 1 is a cross-sectional drawing of a conventional valve nozzle.
Figure 2:
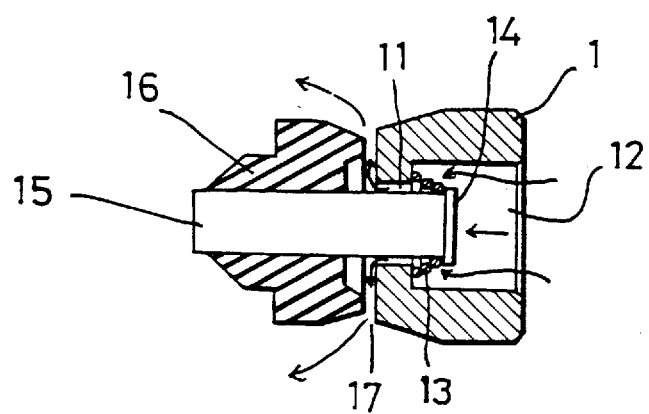
FIG. 2 is a cross-sectional drawing of a conventional valve nozzle illustrating the internal gas flow.
Figure 3:
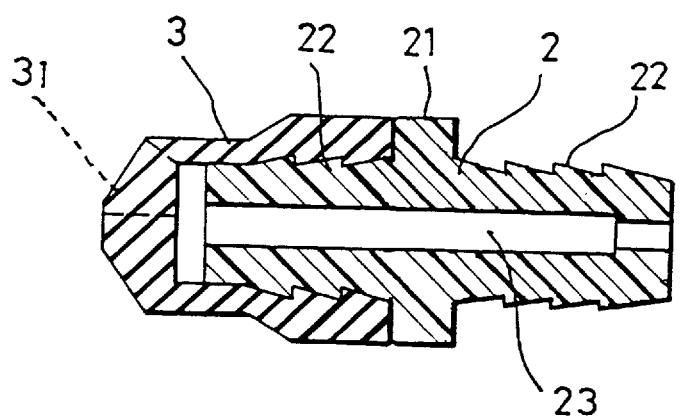
FIG. 3 is a cross-sectional drawing of the embodiment of the invention herein.

Referring to FIG. 3, the preferred embodiment includes a valve stem (2). On the two sides of collar flange (21) on the aforesaid valve stem (2) are tapered retainer lips (22), and a passage (23) is formed through the center of the valve stem (2). Slipped over the retainer lips (22) at one side of the collar flange (21) on the valve stem (2) is a flexible valve sleeve (3), and a slit (31) is incised into the end of the aforesaid valve sleeve (3). The aforesaid slit (31) is incised after the valve sleeve (3) is inserted over the retainer lips (22) on the valve stem (2) to avoid any changes in shape that might result when the slit incision is completed before the valve stem (2) is slipped onto the retainer lips (22) to thereby maintain the sealing precision of the aforesaid slit in all normal conditions.

Figure 4:
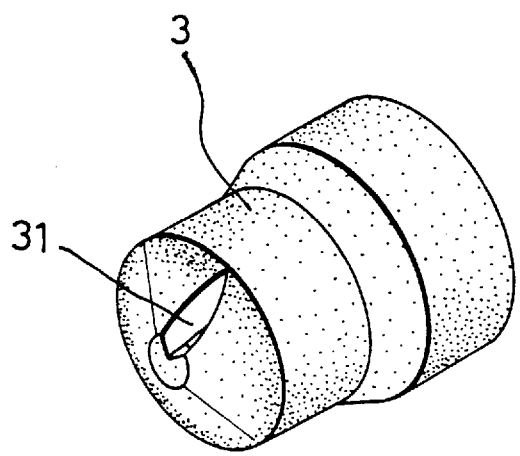
FIG. 4 is an isometric drawing of the embodiment of the invention herein when the opening on the valve sleeve is unclosed.
Figure 5:
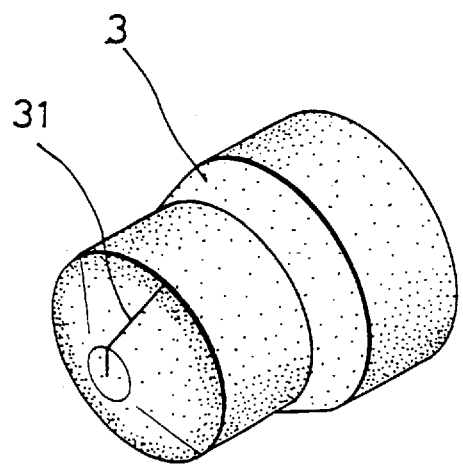
FIG. 5 is an isometric drawing of the embodiment of the invention herein when gas cannot flow through the slit on the valve sleeve.

When a gas flows through the passage (23) towards the valve sleeve (3), since high pressure is produced due to the entry of gas within the valve sleeve (3) and the valve stem (2), the valve sleeve (3) becomes firmly inserted onto the retainer lips (22) on the valve stem (2) and difficult to dislodge, and the gas rushing against the tightly closed slit (31) causes the two sides of the slit (31) to separate as indicated in FIG. 4, thereby allowing the gas to flow out through the aforesaid slit (3). When the gas flows through the valve sleeve (3) towards passage (23), as indicated in FIG. 5, the increase in force that simultaneously occurs in the gas along the inner diameter of the valve sleeve (3), thereby causes the aforesaid slit (31) to close even tighter and, furthermore, since the valve stem (2) is soft in terms of material properties (with higher flexibility recommended), the greater the gas pressure, the tighter the sealing, which thereby makes it difficult for gas flowing axially through the valve sleeve (3) to open the slit (31) due to the difficulty in overcoming the gaseous force maintaining the tight closure of the slit (31) and, therefore, gas cannot pass through the slit (31) and functionally, gas can only flow freely in a single direction.

The structure of the invention herein is uncomplicated and only consists of two components which not only requires fewer molds, but also means simpler fabrication, convenient assembly and, furthermore, lower cost and fewer malfunctions, and with regard to utilization on metering pressure gauges, is obviously more practical than conventional units.

While the invention herein has been described in terms of what is considered the most practical and preferred embodiments, the description of invention herein shall not be construed as any limitation whatsoever binding upon the disclosed embodiments, but is intended to cover the various possible adaptations of the invention herein within the spirit and scope of the broadest interpretations and equivalent configurations thereof.

What is claimed is:

1. A valve nozzle, comprising:

a valve stem having a passage extending along an axis from a first end of the valve stem to a second end of the valve stem, and a collar flange formed thereon, the collar flange having a series of tapered retainer lips; and a flexible valve sleeve having one end positioned on the tapered retainer lips and a second end that extends over and seals the second end of the valve stem, said second end of said valve sleeve having a slit incised therein, said slit being normally in a sealed state of closure except to permit egress of gas flowing through said passage from said first end of the valve stem to the second end of the valve stem.

* * * * *